United States Patent [19]

Phelps et al.

[11] Patent Number: 4,499,193

[45] Date of Patent: Feb. 12, 1985

[54] PROCESS FOR PRODUCING BETA'-SILICON ALUMINUM OXYNITRIDE (B'-SIALON) USING DISCRETE PARTICLES

[75] Inventors: Frankie E. Phelps, Lower Burrell; Thomas L. Francis, Murrysville; Alfred F. LaCamera, Level Green, all of Pa.

[73] Assignee: Aluminum Company of America, Pittsburgh, Pa.

[21] Appl. No.: 450,336

[22] Filed: Dec. 16, 1982

[51] Int. Cl.$^3$ .............................................. C04B 35/56
[52] U.S. Cl. ....................................... 501/98; 501/97; 501/10; 423/327; 264/122
[58] Field of Search ................... 501/97, 98; 264/122

[56] References Cited

U.S. PATENT DOCUMENTS

| | | | |
|---|---|---|---|
| 3,837,871 | 9/1974 | Weaver | 501/98 |
| 3,903,230 | 9/1975 | Kamigaito et al. | 264/122 |
| 3,960,581 | 6/1976 | Cutler | 501/98 |
| 3,991,166 | 11/1976 | Jack et al. | 423/327 |

OTHER PUBLICATIONS

Jack, K. H., J. Material Sciences, 11, pp. 1135–1158, 1976.

*Primary Examiner*—Veronica O'Keefe
*Attorney, Agent, or Firm*—Max L. Williamson

[57] ABSTRACT

A process for producing a refractory material comprising essentially beta'-SiAlON wherein the initial reactants include discrete particles of an $SiO_2$ source and discrete particles of an $Al_2O_3$ source.

8 Claims, 2 Drawing Figures

PROCESS FOR PRODUCING BETA'-SILICON ALUMINUM OXYNITRIDE (B'-SIALON) USING DISCRETE PARTICLES

BACKGROUND

This invention relates to a process for making a silicon aluminum oxynitride refractory material, and more particularly a process which includes the use of $Al_2O_3$ and $SiO_2$ in a discrete particle form as initial reactants.

Silicon aluminum oxynitride refractory materials, and more particularly materials in the $Si_3N_4$-$AlN$-$Al_2O_3$-$SiO_2$ system, are of ever-increasing interest for refractory applications. For ease of identification, compositions within this system are referred to as SiAlON, and a number of different phases of SiAlON have been produced and identified. For example, Jack et al U.S. Pat. No. 3,991,166 describes one phase and methods of making it, the phase having the general formula $Si_{6-z}Al_zO_zN_{8-z}$ where z is greater than zero and less than or equal to five. Various compositions within the bounds of the general formula taught by Jack et al may be produced and each has a crystalline structure similar to beta-$Si_3N_4$ and is consequently identified as beta'-SiAlON. Beta'-SiAlON can be defined as a solid solution of $Al_2O_3$ within a matrix of $Si_3N_4$. The compositional limits of reactants, referred to as effective reactants, to produce beta'-SiAlON may be seen by referring to FIG. 2. The compositional amounts of $Si_3N_4$, AlN and $Al_2O_3$ for any beta'-SiAlON formulation may be determined by referring to line AB which is a plot of the compositions of the aforesaid compounds to produce a beta'-SiAlON having the general formula $Si_{6-z}Al_zO_zN_{8-z}$ where z is greater than zero and less than or equal to five.

Another phase, known as y-phase SiAlON represented by the formula $SiAl_4O_2N_4$, is described in an article entitled "Review: SiAlONs and Related Nitrogen Ceramics", published in *Journal of Material Science*, 11, (1976) at pages 1135-1158. Compositions of SiAlON within a given phase and from phase to phase demonstrate varying characteristics, for example, variances in density, which effect their preferential use in a given application.

Thus far, of all the SiAlON materials, the beta'-SiAlONs have generated the greatest interest because their refractory properties and corrosion resistance characteristics are similar to other nitride refractories such as silicon nitride and silicon oxynitride. Beta'-SiAlON compositions offer a distinct advantage over silicon nitride and silicon oxynitride for making a refractory, however, because beta'-SiAlON material can be used to produce a refractory by conventional sintering techniques, whereas a refractory produced from silicon nitride or silicon oxynitride requires the use of a pressure sintering technique.

A number of processes for making silicon aluminum oxynitride refractories and refractory materials have been suggested. Weaver U.S. Pat. No. 3,837,871 describes a method for producing a product having a substantial amount of what the patentee believes to be the quaternary compound silicon aluminum oxynitride which has a structure similar to that of beta $Si_3N_4$ but with an expanded lattice structure. Weaver's method of making the described product is by hot pressing $Si_2ON_2$ (silicon oxynitride) in the presence of varying amounts of aluminum.

Kamigaito et al U.S. Pat. No. 3,903,230 describes a method of making a silicon aluminum oxynitride ceramic by sintering or hot pressing a mixture of finely divided powders of silicon nitride, alumina and aluminum nitride.

Cutler U.S. Pat. No. 3,960,581 describes a process for producing SiAlON by reacting silicon and aluminum compounds in the presence of carbon and nitrogen. Cutler teaches and stresses the importance of using a reactant material having the silicon and aluminum compounds intimately combined prior to nitriding in order that aluminum oxide is intimately dispersed throughout silicon nitride in the final product. Suggested reactant materials are clay, rice hulls having a solution containing a dissolved aluminum salt absorbed therein, and a precipitate of aluminum and silicon salts. In each case Cutler emphasizes that the silicon and aluminum compound reactants are intimately combined prior to nitriding to produce SiAlON.

Jack et al U.S. Pat. No. 3,991,166 describes a beta'-SiAlON product produced by sintering a mixture of alumina or a compound which decomposes to produce alumina and silicon nitride. Another method of producing beta'-SiAlON as described by Jack et al is nitriding silicon powder in the presence of alumina powder.

It may be noted that several of the foregoing processes employ silicon nitride or silicon oxynitride as reactants. Neither of these compounds is found in nature and they are relatively expensive to produce. Cutler's process provides for the use of reactants found in nature but also requires that the reactants be intimately combined before being converted to SiAlON.

It would be advantageous, therefore, to provide a process whereby readily available and relatively inexpensive reactant materials are nitrided to make silicon aluminum oxynitride materials.

BRIEF SUMMARY OF THE INVENTION

Discrete particles of silica, alumina and carbon may be used as initial reactants in producing essentially beta'-SiAlON. For purposes of this invention, a material that is described as essentially beta'-SiAlON is intended to mean a material having a beta'-SiAlON content greater than approximately 80%. Alternatively, compounds which yield silica or alumina under the temperatures employed in the practice of this invention may be used as sources of silica or alumina. Such sources include silicates such as quartz, cristabolite, tridymite and amorphous silica as silica sources, for example, and aluminum carbonate, aluminum nitrate, aluminum hydroxide or gibbsite (aluminum trihydrate), for example, as alumina sources. References hereinafter to silica ($SiO_2$) and alumina ($Al_2O_3$) are intended to include, but are not limited to, the foregoing materials cited as examples. The discrete particles of silica, alumina and carbon are mixed to uniformly distribute the particles throughout the mixture which is then combined with enough water to plasticize the mixture for forming into shapes. Forming may be by extruding or other molding methods familiar to those skilled in the art to shape the mixture into pellets. The pellets are then heated in a nitrogen atmosphere to convert the reactants to a beta'-SiAlON material.

It is an object of the invention to provide a method of producing beta'-SiAlON from economical, readily available reactants.

This and other objects and advantages will be more fully understood and appreciated with reference to the following description and associated drawings.

DESCRIPTION OF A PREFERRED EMBODIMENT

Figure 1:
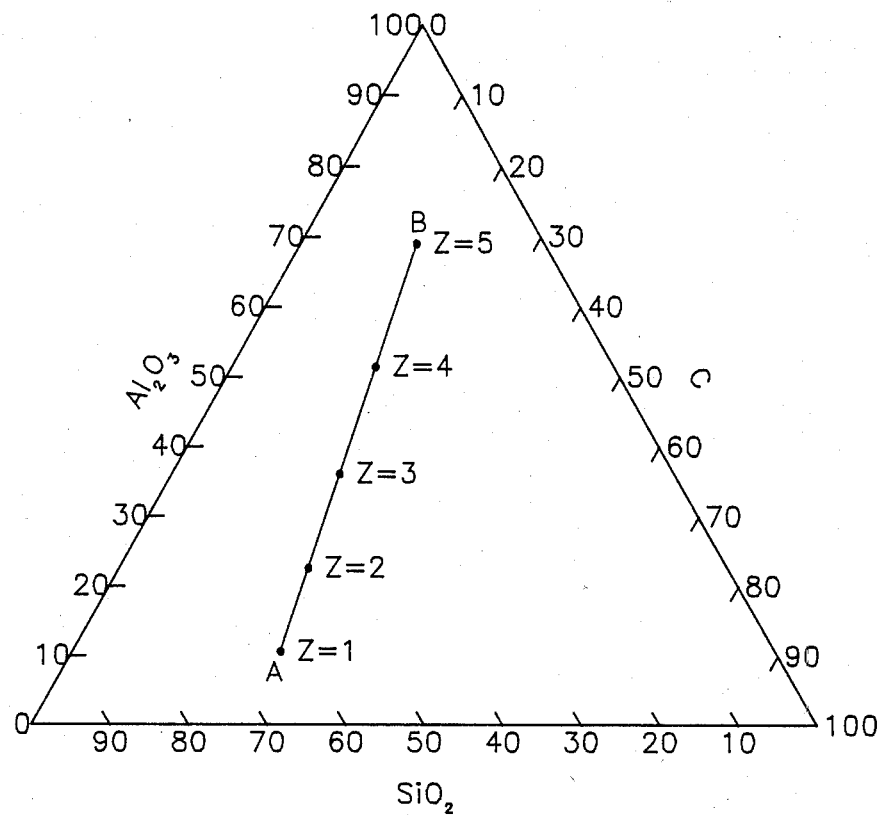
FIG. 1 is a graph showing the compositional limits of the initial reactants to produce beta'-SiAlON by a process of this invention.
Figure 2:
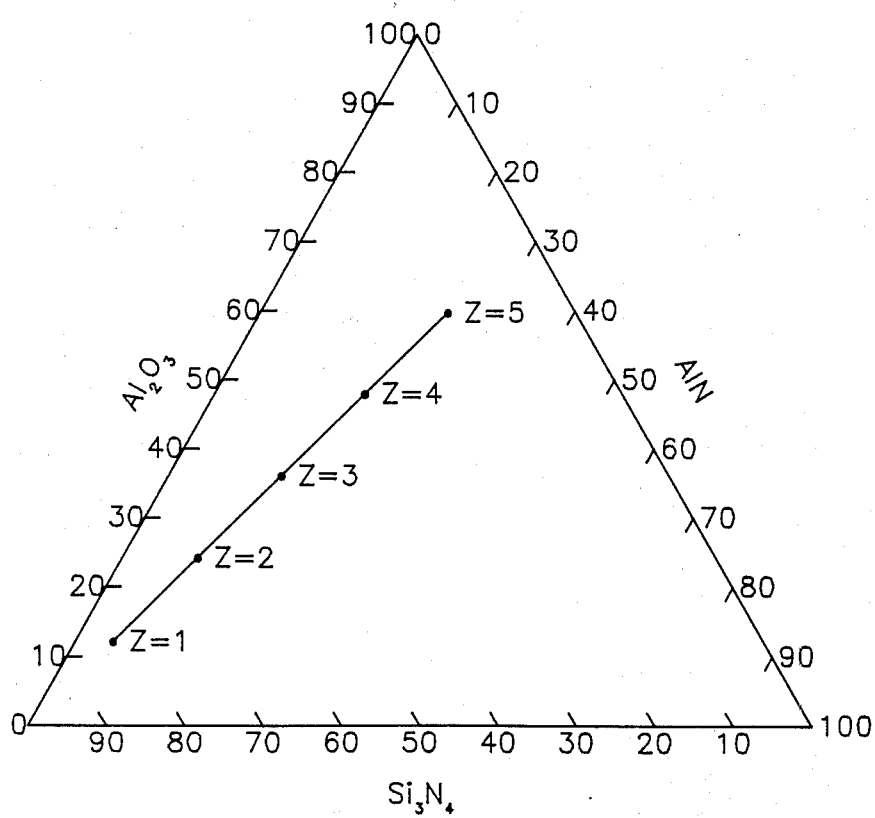
FIG. 2 is a graph showing the compositional limits of transitional or effective reactants to produce beta'-SiAlON by a process of this invention.

As has been noted previously, beta'-SiAlON may be defined as a solid solution of $Al_2O_3$ within an $Si_3N_4$ matrix and is represented by the general formula $Si_{6-z}Al_zO_zN_{8-z}$ where z is greater than zero and less than or equal to five. To produce beta'-SiAlON by a process of this invention, initial reactants $Al_2O_3$, $SiO_2$ and C are provided in compositional ratios as indicated by the line AB in FIG. 1. To produce a beta'-SiAlON when $z=2$ with a formula of $Si_2AlON_3$, for example, would require 23% by weight $Al_2O_3$, 24% by weight C and 53% by weight $SiO_2$. Although not essential, it is advantageous to add iron in a form such as $Fe_2O_3$ as a catalyst in promoting the formation of beta'-SiAlON. It is believed that oxides of other transitional metals such as nickel, chrome or manganese, for example, may also be used as catalysts in the practice of this invention. Only a small percentage of catalyst, such as 2% for example, is added.

The $SiO_2$, $Al_2O_3$ and C initial reactants are mechanically mixed by any suitable mixing method to uniformly blend the particles. The particles are then combined with enough water by mixing either during blending or subsequent thereto, preferably subsequent thereto, to render the mixture plastic for extruding or other molding methods familiar to one skilled in the art to produce a pellet suitable for nitriding. The particle size and particle distribution of the reactants may vary, but generally, the finer the particles, the more complete is the reaction when fired, as will be discussed later.

It has been observed in the practice of a process of this invention using fumed silica, petroleum carbon and $Al_2O_3$ as reactants that approximately 70% of the $Al_2O_3$ reactant goes into solution within an $Si_3N_4$ matrix with a distribution of $Al_2O_3$ particles as follows: 90% less than 136 microns, 50% less than 77 microns, 30% less than 62 microns, and 10% less than 42 microns. If the particle size distribution of $Al_2O_3$ is changed to 90% less than 7 microns, 70% less than 4.4 microns, 50% less than 3.3 microns, 30% less than 2.3 microns, and 10% less than 1.3 microns, the amount of $Al_2O_3$ which goes into solution within the $Si_3N_4$ matrix increases to 81%. With yet a further reduction in particle size and distribution of 90% less than 1.1 microns, 70% less than 0.52 micron, 50% less than 0.37 micron, 30% less than 0.29 micron, and 10% less than 0.20 micron, the percentage of $Al_2O_3$ in solid solution within the $Si_3N_4$ matrix increased to more than 95%.

To determine a preferred median particle size and particle distribution for $SiO_2$, tests were performed in practicing a process of this invention using petroleum carbon, $Al_2O_3$ having a median particle size of 0.37 micron, and $SiO_2$ having a particle size distribution of 90% less than 88 microns, 70% less than 44 microns, 50% less than 27.6 microns, 30% less than 11 microns, and 10% less than 3.9 microns. With the foregoing $SiO_2$ particle distribution, 92.3% of the $SiO_2$ was nitrided and 86% of the $Al_2O_3$ went into solid solution within an $Si_3N_4$ matrix. With a change in $SiO_2$ particle distribution to 90% less than 24.7 microns, 70% less than 11 microns, 50% less than 5.7 microns, 30% less than 3.9 microns, and 10% less than 2.3 microns, 100% of the $SiO_2$ was nitrided and 86% of the $Al_2O_3$ went into solid solution within an $Si_3N_4$ matrix.

On the basis of the above observations, a preferred median particle size for $Al_2O_3$ in the practice of a process of this invention is less than 3.5 microns, and a more preferred median particle size of $Al_2O_3$ is less than 0.37 micron. A preferred median particle size for $SiO_2$ is less than 27.6 microns and a more preferred median particle size is less than 5.7 microns.

After mixing and molding the initial reactants into pellets, the pellets are dried at a low temperature, such as 110° C., for example, to drive off any excess moisture.

Conversion of the reactants into beta'-SiAlON is accomplished by heating the pellets in a nitrogen atmosphere. A preferred method of conversion as hereinafter described is the subject of an improved method for producing SiAlON in an application for a U.S. patent by Phelps et al filed concurrently herewith. To convert the reactants to beta'-SiAlON by the referenced preferred method, the pellets are charged into a reactor adapted to maintain the pellets in a nitrogen atmosphere. Nitrogen may be provided as a gas or a compound, such as ammonia, for example, that will reduce to nitrogen gas at the reaction temperature. It is preferred that the nitrogen be provided continuously under a positive pressure to insure that the nitrogen will uniformly contact all of the reactants during the reaction cycle. A suitable reactor to accomplish the above purposes is a fluid bed reactor or packed bed reactor provided with a nitrogen gas dispersing means near the bottom of the reactor and a nitrogen and off-gas outlet near the top. After charging the pellets into the reactor to form a suitable bed, nitrogen is dispersed through the bed under a positive pressure to purge the reactor of its normal atmosphere.

After establishing a nitrogen atmosphere within the reactor, temperature of the reactants is elevated by a suitable heating means to a temperature of at least 1200° C., preferably at least 1400° C. It is believed that by maintaining the reactants at a given temperature of at least 1200° C. for a sufficient period of time, a portion of the initial reactants are reduced to a portion of the effective reactants necessary for producing beta'-SiAlON. The period of time required to accomplish this initial reaction will vary with the temperature employed. It has been discovered that heating at a temperature of 1400° C. for 1½ hours, for example, is sufficient to accomplish the initial reaction in the process.

It is believed that the above-described initial nitriding step yields $Si_3N_4$, AlN and CO as off-gas and may be represented by the equations:

$$SiO_2 + C \xrightarrow{N_2} Si_3N_4 + CO \qquad (a)$$

$$Al_2O_3 + C \xrightarrow{N_2} AlN + CO. \qquad (b)$$

It may be noted that in addition to $Si_3N_4$ and AlN, $Al_2O_3$ is also required as an effective reactant in producing beta'-SiAlON, and $Al_2O_3$ is provided in a quantity in excess of the amount needed for production of the necessary AlN so that a portion of the Al$_2$O$_3$ remains as an effective reactant after the initial reaction.

Following the above-described initial nitriding step, the reactant temperature is increased to a maximum of 1650° C., preferably within a range of 1550° C. to 1600° C., and maintained within that temperature range for a time sufficient to convert the effective reactants to beta'-SiAlON. It is believed that some conversion of the effective reactants begins to occur at temperatures as low as 1200° C., but it has been discovered that if the temperature is increased, less time is required to effect an essentially complete conversion of the effective reactants to beta'-SiAlON. Within the range of 1550° C. to 1600° C., a time of heating of approximately 1½ hours is sufficient to yield an essentially single phase beta'-SiAlON. Although raising the temperature after the initial heating step to produce effective reactants is advantageous in effecting a conversion of the transitional or effective reactants into an essentially single phase beta'-SiAlON, raising the temperature above approximately 1650° C. promotes the formation of other SiAlON phases which is detrimental to the purposes of the invention.

During the final heating step after nitriding, a nitrogen atmosphere is maintained in the reactor to preserve a stoichiometric balance as expressed in the equation:

$$Si_3N_4 + Al_2O_3 + AlN \rightarrow beta'\text{-SiAlON}.$$

In the foregoing description the two-step nitriding and heating cycle of the reactants was accomplished successively and continuously in a reactor. If desired, the process may be interrupted after the initial nitriding step in making the effective reactants, and the effective reactants can then be transferred to an alternate reactor to make the ultimate conversion to beta'-SiAlON.

The following example is offered to illustrate the production of beta'-SiAlON by a preferred process of this invention.

EXAMPLE 500 g of beta'-SiAlON having a formula Si$_2$AlON$_3$ were prepared from discrete particles of Al$_2$O$_3$, fumed SiO$_2$, petroleum carbon and an Fe$_2$O$_3$ catalyst.

The above-mentioned initial reaction particles of Al$_2$O$_3$, fumed silica and Fe$_2$O$_3$ were provided having median particle sizes as follows: Al$_2$O$_3$—approximately 1 micron, SiO$_2$—0.1 micron, and Fe$_2$O$_3$—2.5 microns. By reference to FIG. 1, the portions of reaction materials required to produce 500 g of Si$_2$AlON$_3$ were determined to be: 115 g Al$_2$O$_3$, 265 g SiO$_2$ and 120 g of carbon.

The reaction materials in the above-stated portions plus 2% or 10 g of Fe$_2$O$_3$ catalyst material were charged into a 4.9 liter ceramic ball mill where the materials were uniformly mixed. The resultant mixture was then mixed with enough water to render the mixture plastic, and pellets having dimensions of approximately 3.1 mm in diameter × 18.75 mm long were produced by extruding.

The pellets were then dried to drive off excess water an were charged into an enclosed reactor vessel provided with an inlet below the pellet bed to permit uniform circulation of gaseous nitrogen through the pellets and an outlet near the top of the vessel to permit discharge of nitrogen and reaction gas products.

The vessel having the pellets therein was enclosed in a heating chamber and nitrogen was charged into the vessel at a pressure sufficient to maintain a flow of nitrogen through the vessel throughout the subsequent heating cycles.

When it was determined that the reaction vessel had been purged of air, temperature within the heating chamber was increased an amount necessary to raise the temperature of the pellets to 1400° C. and that pellet temperature was maintained for 1½ hours.

The pellet temperature was then increased to 1600° C. and maintained thereat for 1½ hours. The pellets were then cooled to room temperature and analyzed for composition. It was determined by X-ray diffraction that the processed material was comprised of beta'-Si$_2$AlON$_3$ in excess of 90% and 3Al$_2$O$_3$·2SiO$_2$ (mullite), alpha-Fe, SiC and other unidentified phases making up the balance.

While the invention has been described in terms of preferred embodiments, the claims appended hereto are intended to encompass other embodiments which fall within the spirit of the invention.

What we claim is:

1. A process for producing an essentially beta'-SiAlON refractory material, the process comprising providing initial reactants of SiO$_2$, Al$_2$O$_3$ and C in discrete particle form.

2. The process according to claim 1 wherein said SiO$_2$ initial reactant is selected from a group of materials consisting of quartz, cristabolite, tridymite and amorphous silica.

3. The process according to claim 1 wherein said Al$_2$O$_3$ initial reactant is selected from a group of materials consisting of aluminum carbonate, aluminum nitrate, aluminum hydroxide and gibbsite.

4. The process according to claim 1 wherein the median particle size of the Al$_2$O$_3$ initial reactant is less than 3.5 microns.

5. The process according to claim 1 wherein the median particle size of the Al$_2$O$_3$ initial reactant is less than 0.5 micron.

6. The process according to claim 1 which further includes providing a catalyst selected from the group consisting of iron oxide, nickel oxide, chrome oxide, manganese oxide, cobalt oxide, vanadium oxide, and any other transitional metal oxides.

7. The process according to claim 1 which further includes providing iron oxide as a catalyst.

8. The process according to claim 1 wherein the initial reactants are provided in compositional ratios as indicated along line AB of FIG. 1.

* * * * *

REEXAMINATION CERTIFICATE (752nd)
United States Patent [19]
Phelps et al.

[11] B1 4,499,193
[45] Certificate Issued  Aug. 25, 1987

[54] PROCESS FOR PRODUCING BETA'-SILICON ALUMINUM OXYNITRIDE (B'-SiAlON) USING DISCRETE PARTICLES

[75] Inventors: Frankie E. Phelps, Lower Burrell; Thomas L. Francis, Murrysville; Alfred F. LaCamera, Level Green, all of Pa.

[73] Assignee: Aluminum Company of America, Pittsburgh, Pa.

Reexamination Request:
No. 90/001,026, Jun. 10, 1986

Reexamination Certificate for:
Patent No.: 4,499,193
Issued: Feb. 12, 1985
Appl. No.: 450,336
Filed: Dec. 16, 1982

[51] Int. Cl.$^4$ ............... C04B 35/58; C03C 10/02; C01B 33/26
[52] U.S. Cl. ............................. 501/98; 501/10; 501/97; 423/327; 264/122
[58] Field of Search .............. 501/97, 98; 423/327; 264/122

[56] References Cited

U.S. PATENT DOCUMENTS

| | | | |
|---|---|---|---|
| 3,960,581 | 6/1976 | Cutler | 501/98 |
| 3,991,166 | 11/1976 | Jack et al. | 423/327 |

OTHER PUBLICATIONS

G. M. Renlund; "Chemical and Mineralogical Effects of Impurities on the Formation and Sinterability of Sialon", M.S. Thesis, Univ. of Utah, Published: Nov. 1978; Abstract, pp. 16, 18.

I. B. Cutler: "SIALON Refractories from Clay and Coal"; D.O.E. Report; Jun. 1977; pp. 35–37, Sep. 1977; pp. 14–15, and Sep. 1978; pp. 47–49.

*Hackh's Chemical Dictionary*, 3rd. Ed., 1953, p. 376.

*The Encyclopedia of Chemistry*, 1957; pp. 854, 856.

H. R. Baumgartner and G. O. Weaver, "Preparation of Beta Prime SIALON, etc."; Technical Paper, Sep. 1975, p. 2.

J. G. Lee: "Carbide and Nitride Ceramics by Carbothermal Reduction of Silica"; Ph.D Dissertation, Univ. of Utah, Published: Jun. 1976, pp. 53–56.

*Primary Examiner*—M. L. Bell

[57] ABSTRACT

A process for producing a refractory material comprising essentially beta'-SiAlON wherein the initial reactants include discrete particles of an $SiO_2$ source and discrete particles of an $Al_2O_3$ source.

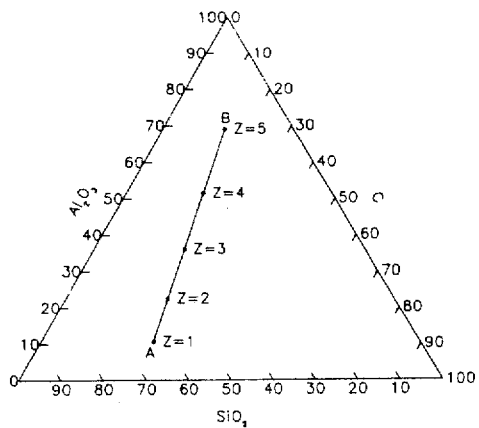

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claims 2–8 are determined to be patentable as amended.

New claim 9 is added and determined to be patentable.

2. The process according to claim [1] *9* wherein said SiO2 initial reactant is selected from a group of materials consisting of quartz, cristabolite, tridymite and amorphous silica.

3. The process according to claim [1] *9* wherein said $Al_2O_3$ initial reactant is selected from a group of materials consisting of aluminum carbonate, aluminum nitrate, aluminum hydroxide and gibbsite.

4. The process according to claim [1] *9* wherein the median particle size of the $Al_2O_3$ initial reactant is less than 3.5 microns.

5. The process according to claim [1] *9* wherein the median particle size of the $Al_2O_3$ initial reactant is less than 0.5 micron.

6. The process according to claim [1] *9* which further includes providing a catalyst selected from the group consisting of iron oxide, nickel oxide, chrome oxide, manganese oxide, cobalt oxide, vanadium oxide, and any other transitional metal oxides.

7. The process according to claim [1] *9* which further includes providing iron oxide as a catalyst.

8. The process according to claim [1] *9* wherein the initial reactants are provided in compositional ratios as indicated along line AB of FIG. 1.

*9. In a process for producing an essentially beta'-SiAlON refractory material comprising mixing the initial reactants of $SiO_2$, $Al_2O_3$, and C, and heating the mixture to convert the initial reactants to beta'-SiAlON, the improvement wherein each of the individual initial reactants is in discrete particle form.*

* * * * *